United States Patent
Michiels et al.

(10) Patent No.: US 10,171,234 B2
(45) Date of Patent: Jan. 1, 2019

(54) WIDE ENCODING OF INTERMEDIATE VALUES WITHIN A WHITE-BOX IMPLEMENTATION

(71) Applicant: NXP B.V., Eindhoven (NL)

(72) Inventors: Wilhelmus Petrus Adrianus Johannus Michiels, Eindhoven (NL); Joppe Willem Bos, Leuven (BE); Philippe Teuwen, Louvain (BE)

(73) Assignee: NXP B.V., Eindhoven (NL)

( * ) Notice: Subject to any disclaimer, the term of this patent is extended or adjusted under 35 U.S.C. 154(b) by 14 days.

(21) Appl. No.: 14/971,851

(22) Filed: Dec. 16, 2015

(65) Prior Publication Data

US 2017/0180119 A1 Jun. 22, 2017

(51) Int. Cl.
*H04L 9/08* (2006.01)
*H04L 9/14* (2006.01)
*H04L 29/06* (2006.01)
*H04L 9/06* (2006.01)

(52) U.S. Cl.
CPC .......... *H04L 9/0819* (2013.01); *H04L 9/0618* (2013.01); *H04L 9/14* (2013.01); *H04L 63/0428* (2013.01); *H04L 2209/16* (2013.01); *H04L 2209/24* (2013.01); *H04L 2209/34* (2013.01)

(58) Field of Classification Search
USPC ......................................................... 713/168
See application file for complete search history.

(56) References Cited

U.S. PATENT DOCUMENTS

| | | | | |
|---|---|---|---|---|
| 8,806,187 | B1* | 8/2014 | Vemula | H04L 67/34 |
| | | | | 713/150 |
| 9,515,818 | B2* | 12/2016 | Kindarji | H04L 9/0637 |
| 9,665,699 | B2* | 5/2017 | Michiels | H04L 9/0631 |
| 2007/0014394 | A1 | 1/2007 | Harder | |
| 2007/0086586 | A1* | 4/2007 | Jakubowski | H04L 9/0662 |
| | | | | 380/28 |
| 2010/0054461 | A1* | 3/2010 | Ciet | H04L 9/002 |
| | | | | 380/29 |
| 2010/0150343 | A1* | 6/2010 | Rombouts | H04L 9/002 |
| | | | | 380/44 |
| 2010/0296649 | A1* | 11/2010 | Katzenbeisser | G06F 21/10 |
| | | | | 380/28 |
| 2010/0303229 | A1* | 12/2010 | Unruh | H04L 9/0637 |
| | | | | 380/28 |
| 2011/0067012 | A1* | 3/2011 | Eisen | G06F 8/51 |
| | | | | 717/140 |

(Continued)

FOREIGN PATENT DOCUMENTS

EP 2922235 A1 9/2015

OTHER PUBLICATIONS

White-Box Cryptography and an AES Implementation, Stanley Chow et al.*

(Continued)

*Primary Examiner* — Taghi T Arani
*Assistant Examiner* — Badriot Champakesan

(57) ABSTRACT

A method for a method for mapping an input message to an output message by a keyed cryptographic operation in a cryptographic system, including a plurality of rounds wherein each round has a substitution layer, wherein wide encoding is used on the substitution layer in the rounds that require protection from attacks.

16 Claims, 4 Drawing Sheets

(56) References Cited

U.S. PATENT DOCUMENTS

| | | | | |
|---|---|---|---|---|
| 2011/0116625 | A1* | 5/2011 | Michiels | G06F 21/14 380/28 |
| 2012/0002807 | A1* | 1/2012 | Michiels | H04L 9/002 380/28 |
| 2012/0045050 | A1* | 2/2012 | Farrugia | H04L 9/0631 380/28 |
| 2012/0093313 | A1* | 4/2012 | Michiels | H04L 9/002 380/255 |
| 2012/0170739 | A1* | 7/2012 | Karroumi | H04L 9/0631 380/28 |
| 2012/0192283 | A1* | 7/2012 | Gu | G06F 21/14 726/26 |
| 2014/0019771 | A1* | 1/2014 | Emmett | H04L 9/002 713/189 |
| 2015/0163054 | A1* | 6/2015 | Roelse | H04L 9/06 380/278 |
| 2015/0215117 | A1* | 7/2015 | Kim | G09C 1/00 380/28 |
| 2015/0326393 | A1* | 11/2015 | Takashinna | H04N 21/4408 380/30 |
| 2016/0080143 | A1* | 3/2016 | Kindarji | H04L 9/0637 380/28 |
| 2016/0092871 | A1* | 3/2016 | Gordon | H04L 63/0414 705/44 |
| 2016/0277180 | A1* | 9/2016 | Wang | G09C 1/00 |
| 2016/0328543 | A1* | 11/2016 | Hoogerbrugge | G06F 21/14 |
| 2017/0033922 | A1* | 2/2017 | Michiels | G06F 21/14 |
| 2017/0352298 | A1* | 12/2017 | Drexler | G09C 1/00 |
| 2017/0366339 | A1* | 12/2017 | Noura | G09C 1/00 |

OTHER PUBLICATIONS

Advanced Encryption Standard (AES) by NIST, Nov. 26, 2001; Different Power Analysis by Kocher et al Pub. 1999; Unifying DPA attacks by Mangard et al Pub. Jan. 2009.*

Synchrosoft MCFACT—Secure Data Processing Technology, Re-Trust Sixth Quarterly Meeting, Mar. 11, 2008, Villach, Austria, 108 pages.

Chow, et al., White-box cryptography and an AES implementation, Selected Areas in Cryptography—SAC 2002 (Kaisa Nyberg and Howard M. Heys, eds.) Lecture Notes in Computer Science, vol. 2595, Springer, 2003, pp. 250-270.

Chow, et al., A White-Box DES Implementation for DRM Applications, Digital Rights Management: ACM CCS-9 Workshop, DRM 2002, Washington, D.C., USA, Nov. 18, 2002, 1-16.

Advanced Encryption Standard (AES), National Institute of Standards and Technology (NIST), FIPS Pub 197, U.S. Department of Commerce, Nov. 26, 2001.

Kocher, Paul, et al., "Differential Power Analysis;" Michael Wiener, Ed.: Crypto 1999; vol. 1666, Springer-Verlag Berlin Heidelberg 1999; pp. 388-397.

Mangard, Stefan, et al.; "One for All—All for One: Unifying Standard DPA Attacks" IET Information Security 5 (2011), No. 2, Jan. 2009.

* cited by examiner

WIDE ENCODING OF INTERMEDIATE VALUES WITHIN A WHITE-BOX IMPLEMENTATION

TECHNICAL FIELD

Various exemplary embodiments disclosed herein relate generally to wide encoding of intermediate values within a white-box implementation of a cryptographic function.

BACKGROUND

The Internet provides users with convenient and ubiquitous access to digital content. Because the Internet is a powerful distribution channel, many user devices strive to directly access the Internet. The user devices may include a personal computer, laptop computer, set-top box, internet enabled media player, mobile telephone, smart phone, tablet, mobile hotspot, or any other device that is capable of accessing the Internet. The use of the Internet as a distribution medium for copyrighted content creates the compelling challenge to secure the interests of the content provider. Increasingly, user devices operate using a processor loaded with suitable software to render (playback) digital content, such as audio and/or video. Control of the playback software is one way to enforce the interests of the content owner including the terms and conditions under which the content may be used. Previously many user devices were closed systems. Today more and more platforms are partially open. Some users may be assumed to have complete control over and access to the hardware and software that provides access to the content and a large amount of time and resources to attack and bypass any content protection mechanisms. As a consequence, content providers must deliver content to legitimate users across a hostile network to a community where not all users or user devices can be trusted.

Secure software applications may be called upon to carry out various functions such as, for example, cryptographic functions used to protect and authenticate digital content. In order to counter attacks, these algorithms have to be obfuscated (hidden) in order to prevent reverse engineering and modification of the algorithm or prohibit obtaining the user-specific secure information. Accordingly, the functions of the secure software application may be carried out by various functions as defined by the instruction set of the processor implementing the secure software. For example, one way to obscure these functions is by the use of lookup tables.

Content providers must deliver content to legitimate users across a hostile network to a community where not all users or devices can be trusted. This has led to the development of white-box cryptography. In the white-box cryptography scenario it is assumed that the user has complete control of the hardware and software that provides access to the content, and an unlimited amount of time and resources to attack and bypass any content protection mechanisms. The secure software code that enforces the terms and conditions under which the content may be used should be tamper resistant. Digital rights management is a common application of secure software applications. The general approach in digital rights management for protected content distributed to user devices is to encrypt the digital content using for example, DES (Data Encryption Standard), AES (Advanced Encryption Standard), or using other known encryption schemes, and to use decryption keys to recover the digital content. These decryption keys must be protected to prevent unauthorized access to protected material.

In the digital right management scenario, the attacker has complete control of the software enforcing the management and access to the protected content. Accordingly, the attacker can modify software and also seek to obtain cryptographic keys used to encrypt the protected content. Such keys may be found by analyzing the software Regarding key distribution, a media player has to retrieve a decryption key from a license database in order to play back the media. The media player then has to store this decryption key somewhere in memory for the decryption of the encrypted content. This leaves an attacker two options for an attack on the key. First, an attacker may reverse engineer the license database access function allowing the attacker to retrieve asset keys from all license databases. In this situation the attacker does not need to understand the internal working of the cryptographic function. Second, the attacker may observe accesses of the memory during content decryption, thus the attacker may retrieve the decryption key. In both cases the key is considered to be compromised.

The widespread use of digital rights management (DRM) and other secure software has given rise to the need for secure, tamper-resistant software that seeks to complicate tampering with the software. Various techniques for increasing the tamper resistance of software applications exist. Most of these techniques are based on hiding the embedded knowledge of the application by adding a veil of randomness and complexity in both the control and the data path of the software application. The idea behind this is that it becomes more difficult to extract information merely by code inspection. It is therefore more difficult to find the code that, for example, handles access and permission control of the secure application, and consequently to change it.

As used herein, white-box cryptography includes a secure software application that performs cryptographic functions in an environment where an attacker has complete control of the system running the white-box cryptography software. Thus, the attacker can modify inputs and outputs, track the operations of the software, sample and monitor memory used by the software at any time, and even modify the software. Accordingly, the secure functions need to be carried out in a manner that prevents the disclosure of secret information used in the secure functionality. White-box cryptography functions may be implemented in various ways. Such methods include: obscuring the software code; using complex mathematical functions that obscure the use of the secret information; using look-up tables; using finite state machines; or any other methods that carry out cryptographic functions but hide the secret information needed for those secure functions. A white-box implementation may also contain components that include anti-debugging and tamper-proofing properties.

There are several reasons for preferring a software implementation of a cryptographic algorithm to a hardware implementation. This may, for instance, be the case because a software solution is renewable if the keys leak out, because it is has lower cost, or because the application-developer has no influence on the hardware where the white-box system is implemented.

SUMMARY

A brief summary of various exemplary embodiments is presented below. Some simplifications and omissions may be made in the following summary, which is intended to highlight and introduce some aspects of the various exemplary embodiments, but not to limit the scope of the invention. Detailed descriptions of an exemplary embodiment adequate to allow those of ordinary skill in the art to make and use the inventive concepts will follow in later sections.

Various embodiments relate to a method for mapping an input message to an output message by a keyed cryptographic operation in a cryptographic system, the keyed cryptographic operation including a plurality of substitution layers and state data, including: mapping the input message to first state data in a first substitution layer of the keyed cryptographic operation, wherein the first substitution layer includes N basic blocks that implement the first substitution layer and wherein a non-linear encoding having a first size is placed on the inputs and outputs of the N basic blocks of the first substitution layer, where N is an integer; mapping the first state data to second state data in a plurality of intermediate substitution layers of the keyed cryptographic operation, wherein the intermediate substitution layers include M blocks that implement the intermediate substitution layers and wherein a plurality of non-linear encodings having a second size are placed on the inputs and outputs of the M basic blocks of the intermediate substitution layers, where M is an integer; and mapping the second state data to an output message in a final substitution layer of the keyed cryptographic operation, wherein the final substitution layer includes K basic blocks that implement the final substitution layer and wherein a non-linear encoding having a third size is placed on the inputs and outputs of the K basic blocks of the final substitution layer, where K is an integer, wherein the first and second size is greater than the second size, wherein N>M, and wherein K>M.

Various embodiments are described, wherein the first and second size is greater than or equal to twice the second size.

Various embodiments are described, wherein the cryptographic operation is the Advanced Encryption Standard (AES).

Various embodiments are described, wherein the cryptographic operation is the Data Encryption Standard (DES).

Various embodiments are described, wherein the first size is 8-bits, the second size is 4-bits, and the third size is 8-bits.

Various embodiments are described, wherein: basic blocks implementing an XOR function in the intermediated substitution layers operate on 4-bit inputs to produce 4-bit outputs, and basic blocks implementing an XOR function in the first and last substitution layers operate on 8-bit inputs to produce 8-bit outputs.

Various embodiments are described, wherein: basic blocks implementing an XOR function in the intermediated substitution layers operate on inputs having the second size to produce outputs having the second size; basic blocks implementing an XOR function in the first substitution layer operate on inputs having the first size to produce outputs having the first size; and basic blocks implementing an XOR function in the last substitution layer operate on inputs having the third size to produce outputs having the third size.

Various embodiments are described, wherein a linear encoding is also placed on the inputs and outputs of the M basic blocks in the intermediate substitution layers.

Further various embodiments relate to a non-transitory machine-readable storage medium encoded with instructions for implementing mapping an input message to an output message by a keyed cryptographic operation in a cryptographic system, the keyed cryptographic operation including a plurality of substitution layers and state data, including: instructions for mapping the input message to first state data in a first substitution layer of the keyed cryptographic operation, wherein the first substitution layer includes N basic blocks that implement the first substitution layer and wherein a non-linear encoding having a first size is placed on the inputs and outputs of the N basic blocks of the first substitution layer, where N is an integer; instructions for mapping the first state data to second state data in a plurality of intermediate substitution layers of the keyed cryptographic operation, wherein the intermediate substitution layers include M blocks that implement the intermediate substitution layers and wherein a plurality of non-linear encodings having a second size are placed on the inputs and outputs of the M basic blocks of the intermediate substitution layers, where M is an integer; and instructions for mapping the second state data to an output message in a final substitution layer of the keyed cryptographic operation, wherein the final substitution layer includes K basic blocks that implement the final substitution layer and wherein a non-linear encoding having a third size is placed on the inputs and outputs of the K basic blocks of the final substitution layer, where K is an integer, wherein the first and second size is greater than the second size, wherein N>M, and wherein K>M.

Various embodiments are described, wherein the first and second size is greater than or equal to twice the second size.

Various embodiments are described, wherein the cryptographic operation is the Advanced Encryption Standard (AES).

Various embodiments are described, wherein the cryptographic operation is the Data Encryption Standard (DES).

Various embodiments are described, wherein the first size is 8-bits, the second size is 4-bits, and the third size is 8-bits.

Various embodiments are described, wherein: basic blocks implementing an XOR function in the intermediated substitution layers operate on 4-bit inputs to produce 4-bit outputs, and basic blocks implementing an XOR function in the first and last substitution layers operate on 8-bit inputs to produce 8-bit outputs.

Various embodiments are described, wherein: basic blocks implementing an XOR function in the intermediated substitution layers operate on inputs having the second size to produce outputs having the second size; basic blocks implementing an XOR function in the first substitution layer operate on inputs having the first size to produce outputs having the first size; and basic blocks implementing an XOR function in the last substitution layer operate on inputs having the third size to produce outputs having the third size.

Various embodiments are described, wherein a linear encoding is also placed on the inputs and outputs of the M basic blocks in the intermediate substitution layers.

BRIEF DESCRIPTION OF THE DRAWINGS

In order to better understand various exemplary embodiments, reference is made to the accompanying drawings, wherein.

To facilitate understanding, identical reference numerals have been used to designate elements having substantially the same or similar structure and/or substantially the same or similar function.

DETAILED DESCRIPTION

Figure 1:
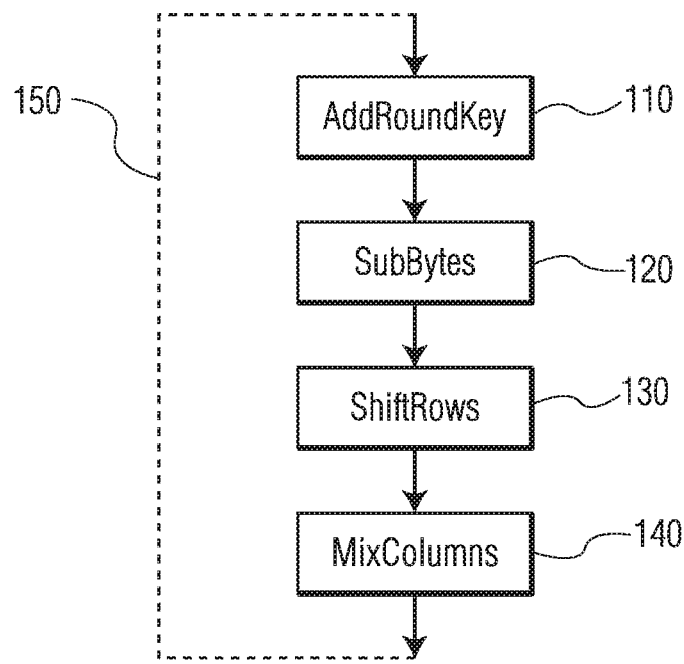
FIG. 1 illustrates the main steps of a round of AES.

The description and drawings illustrate the principles of the invention. It will thus be appreciated that those skilled in the art will be able to devise various arrangements that, although not explicitly described or shown herein, embody the principles of the invention and are included within its scope. Furthermore, all examples recited herein are principally intended expressly to be for pedagogical purposes to aid the reader in understanding the principles of the invention and the concepts contributed by the inventor(s) to furthering the art, and are to be construed as being without limitation to such specifically recited examples and conditions. Additionally, the term, "or," as used herein, refers to a non-exclusive or (i.e., and/or), unless otherwise indicated (e.g., "or else" or "or in the alternative"). Also, the various embodiments described herein are not necessarily mutually exclusive, as some embodiments can be combined with one or more other embodiments to form new embodiments.

There are several reasons for preferring a software implementation of a cryptographic algorithm to a hardware implementation. This may, for instance, be the case because a software solution is renewable if the keys leak out, because it is has lower cost, or because the application-developer has no influence on the hardware where the white-box system is implemented. While the description of embodiments below are directed to software implementation running on a processor, it is noted that these embodiments may also be partially or completely implemented in hardware as well. The lookup tables and finite state machines that are described may be implemented in hardware to carry out the various functions described.

A table-based approach to a white-box implementation of the Advanced Encryption Standard (AES) and the Data Encryption Standard (DES) were proposed in the following papers: "White-Box Cryptography and an AES Implementation", by Stanley Chow, Philip Eisen, Harold Johnson, and Paul C. Van Oorschot, in Selected Areas in Cryptography: 9th Annual International Workshop, SAC 2002, St. John's, Newfoundland, Canada, Aug. 15-16, 2002, referred to hereinafter as "Chow 1"; and "A White-Box DES Implementation for DRM Applications", by Stanley Chow, Phil Eisen, Harold Johnson, and Paul C. van Oorschot, in Digital Rights Management: ACM CCS-9 Workshop, D R M 2002, Washington, D.C., USA, Nov. 18, 2002, referred to hereinafter as "Chow 2". Chow 1 and Chow 2 disclose methods of using a table-based approach to hide the cryptographic key by a combination of encoding its tables with random bijections, and extending the cryptographic boundary by pushing it out further into the containing application.

As noted, for many cryptographic operations it is desired to have a white-box implementation. The invention may be applied, for example, to symmetric and asymmetric cryptographic operations. Also, the invention may be applied to block ciphers, stream ciphers, message authentication schemes, signature schemes, etc. Note that the invention may also be applied to hash functions. The latter is especially useful if the hash function is used as a building block which processes secret information, e.g., a secret key, secret data, etc. For example, the invention may be applied to a hash function used in a keyed-Hash Message Authentication Code (HMAC or KHMAC). Well known block ciphers include: Advanced Encryption Standard (AES), Secure And Fast Encryption Routine, (SAFER, and variants SAFER+ and SAFER++), Blowfish, Data Encryption Standard (DES), etc. A well-known stream cipher is RC4. Moreover any block cipher can be used as stream cipher using an appropriate mode of operation, e.g., Cipher feedback (CFB), Counter mode (CTR), etc.

The input message can represent, e.g., encrypted content data, such as multi-media data, including audio and/or video data. The encrypted content data may also include encrypted software, e.g., encrypted computer code representing some computer application, e.g., a computer game, or an office application. The input message may also represent a key for use in a further cryptographic operation. The latter may be used, for example, in a key exchange protocol, wherein a white-box implementation according to the invention encrypts and/or decrypts data representing a new key. The input data may also be plain data, for example, plain user data. The latter is especially advantageous in message authentication schemes. A white-box implementation according to the invention may have the property that the implementation may only be used for encryption, only be used for decryption, but not for both. For example, this property can be achieved if the implementation uses look-up tables which are not bijective, for example, a look-up table having more input bits than output bits. Accordingly, if a user only has a white-box decryptor, the user may verify a MAC code but not create new MACs. This strengthens the non-repudiation properties of such a message authentication scheme.

The white-box implementation may be implemented using a plurality of basic blocks. The plurality of basic blocks is interconnected, in the sense that some of the blocks build on the outputs of one or more of the previous blocks. A basic block may be implemented in hardware, for example, as a computer chip. A basic block may use a switch board, a state machine or any other suitable construction for implementing functions in computer hardware. A basic block may also be implemented in software running on a general purpose computer chip, e.g. a microprocessor. For example, a basic block may use a plurality of computer instructions, including arithmetical instructions, which together implement the functionality of the basic block. A widely used implementation for the basic block, which may be used both in software and hardware, is a look-up table. For example, Chow 1 and Chow 2 take this approach to implement the AES and DES block ciphers. A look-up table implementation includes a list which lists for possible input values, an output value. The input value may be explicit in the lookup table. In that situation the look-up table implementation could map a particular input to a particular output by searching in the list of input values for the particular input. When the particular input is found the particular output is then also found. For example, the particular output may be stored alongside the particular input. Preferably, the input values are not stored explicitly, but only implicitly. For example, if the possible inputs are a consecutive range, e.g. of numbers or bit-strings, the look-up table may be restricted to storing a list of the output values. A particular input number may, e.g., be mapped to the particular output which is stored at a location indicated by the number. Further, finite state machines or code obfuscation may be used to implement the white-box implementation.

For example, a look up table for a function may be created by computing the output value of the function for its possible inputs and storing the outputs in a list. If the function depends on multiple inputs the outputs may be computed and stored for all possible combinations of the multiple inputs. Look-up tables are especially suited to implement non-linear functions, which map inputs to output in irregular ways. A white-box implementation can be further obfuscated, as is explained below, by applying to one or more of its look-up tables a fixed obfuscating input encoding and a fixed output encodings. The results of applying a fixed obfuscating input encoding and output encodings is then fully pre-evaluated. Using this technique, a look-up table would be replaced by an obfuscated look-up table which has the same dimensions, that it takes the same number input bits and produces the same number of output bits. The input encoding and output encoding used in such obfuscation are not explicit in the final white-box implementation.

The network of basic blocks are arranged to compute an output message when they are presented with an input message. Typically, the input message is operated upon by a number of basic input blocks. A number of further basic blocks may take input from one or more of the basic input blocks and/or from the input. Yet further basic blocks can take input in any combination of the input message, the output of basic input blocks and the output of the further basic blocks. Finally some set of basic exit blocks, i.e., at least one, produce as output all or part of the output-message. In this manner a network of basic blocks emerges which collectively computes the mapping from the input message to output message.

The key used may be a cryptographic key and may contain sufficient entropy to withstand an anticipated brute force attack. It is noted that in a white-box implementation, the key is typically not explicitly present in the implementation. This would risk the key being found by inspection of the implementation. Typically, the key is only present implicitly. Various ways are known to hide a key in a cryptographic system. Typically, at least the method of partial evaluation is used, wherein a basic block which needs key input is evaluated in-so-far that it does not depend on the input-message. For example, a basic operation wherein an input-value, a masking value, which does not depend on the input-message, e.g. a value from a substitution box (S-box), and a key-value need to be XORed can be partially evaluated by XORing the key value and the masking value together beforehand. In this way the operation still depends on the key-value although the key-value is not explicitly present in the implementation. Instead, only the XOR between the key-value and masking-value is present in the implementation. Note that, more complicated ways and/or further ways of hiding the keys are compatible with embodiments of this invention.

An interesting category of attacks on white-box implementations are the software counterpart of the hardware differential power analysis (DPA) attack as applied by the cryptographic hardware community. Since the late 1990s, it is publicly known that the statistical analysis of a power trace obtained when executing a cryptographic primitive might correlate to, and hence reveal information about, the secret key material used. Typically in this sort of attack, one assumes access to the hardware implementation of a known cryptographic algorithm. $I(p_i, k)$ denotes a target intermediate state of the algorithm with input $p_i$ and where only a small portion of the secret key is used, denoted by k. One assumes that the power consumption of the device at state $I(p_i, k)$ is the sum of a data dependent component and some random noise, i.e., $\mathcal{L}(I(p_i, k))+\delta$, where the function $\mathcal{L}(s)$ returns the power consumption of the device during state s and $\delta$ denotes some leakage noise. It is common to assume that the noise is random and independent from the intermediate state and is normally distributed with zero mean. Because the adversary has access to the hardware implementation, the adversary can obtain triples $(t_i, p_i, c_i)$. Here $p_i$ is one plaintext input chosen arbitrarily by the adversary, $c_i$ is ciphertext output computed by the hardware implementation using a fixed unknown key, and the value $t_i$ shows the power consumption over the time of the hardware implementation to compute the output ciphertext $c_i$. The leakage $\mathcal{L}(I(p_i, k))+\delta$ is just a small fraction of this entire power trace $t_i$.

The goal of an attacker is to recover the part of the key k by comparing the real power measurements $t_i$ of the device with an estimation of the power consumption under all possible hypotheses for k. The idea behind a Differential Power Analysis (DPA) attack is to divide the measurement traces in two distinct sets according to some property. For example, this property could be the value of the least significant bit of the intermediate state $I(p_i, k)$. One assumes—and this is confirmed in practice by measurements on unprotected hardware—that the distribution of the power consumptions for these two sets is different, i.e., they have different means and standard deviations.

In order to obtain information about part of the secret key k, for each trace $t_i$ and input $p_i$ one enumerates all possible values for k (typically $2^8=256$ when attacking a key-byte), computes the intermediate value $g_i=I(p_i, k)$ for this key guess, and divides the traces $t_i$ into two sets according to this property measured at $g_i$. If the key guess k was correct, then the difference of the subsets' averages will converge to the difference of the means of the distributions. However, if the key guess is wrong then the data in the sets can be seen as a random sampling of measurements and the difference of the means should converge to zero. This allows one to observe correct key guesses if enough traces are available. The number of traces required depends, among other things, on the measurement noise and means of the distributions (and hence is platform specific).

While having access to output ciphertexts is helpful to validate the recovered key, it is not strictly required. Inversely, one can attack an implementation where only the output ciphertexts are accessible, by targeting intermediate values in the last round. The same attack may be applied to the decryption operation.

To assess the security of a binary executable implementing a cryptographic primitive, which is designed to be secure in the white-box attack model, one can execute the binary on a CPU of the corresponding architecture and observe its power consumption to mount a differential power analysis attack. However, in the white-box model, one can do much better as the model implies that an attacker may observe everything without any measurement noise. In practice such level of observation may be achieved by instrumenting the binary. From a high-level, the idea behind differential computational analysis is to obtain software trace such as a trace which records memory addresses during the execution of the white-box implementation. These traces are used as input to a DPA attack.

The embodiments described herein illustrate an approach for limiting the collisions in a white-box implementation because these may be exploited by a differential attack. Let a function g return an intermediate value of the algorithm which can be computed using partial information of the input (denoted by $x_i$) and partial information of the secret key (denoted by $k_i$). Let $v=g(x_i, k_i)$ denote this intermediate value of the algorithm. A typical example in AES is that g targets the S-box computation which only uses a single input and key byte. It is assumed that the size of v is smaller than $x_i$: this means that collisions occur. In other words multiple values $x_i$ map to the same $v$. Now, a differential attack with difference of means as distinguisher on any bit of $v$ may be applied. Let $f(v, j)$ return the jth bit of $v$. In the following it is assumed that the adversary has a fixed a value for j. Then the traces, each associated with a value for $x_i$, are partitioned into two sets $V_0$ and $V_1$ corresponding to $f(v, j)=0$ and $f(v, j)=1$, respectively. Let p be the position in the traces where the white-box implementation computes or uses value v and let this value be encoded by a fixed encoding h. Now, first suppose that the key has been correctly guessed. Then the two sets $V_0$ and $V_1$ are disjoint; note that the sets $V_0$ and $V_1$ are based on the non-encoded values. This implies the encoded values that are handled at position p (which correspond to these traces in $V_0$ and $V_1$) are also disjoint.

Next, suppose that the key has been incorrectly guessed. This means that $V_0$ and $V_1$ give an arbitrary partition of the possible values for $x_i$ (not, as for the correct key guess, based on whether the intermediate value v has a 1 or 0 on a given position). Because of the collisions that occur, this means that the set of encoded values that are handled at position p is with high probability the same for both $V_0$ and $V_1$, viz. all possible values $h(v)$. As a result of this different behavior, the average value of the traces at position p for $V_0$ and $V_1$ will most likely differ more for a correct key guess than for an incorrect key guess.

An example where the above problem occurs is in the white-box AES implementation of Chow. There, the output of an S-box is encoded by a linear mapping followed by non-linear nibble encodings. One output nibble is considered and to ease the explanation the linear mapping is not considered. For the S-box, $2^4$ inputs collide to the same 4-bit nibble v. Hence, the above attack can be applied. If the linear mapping is also taken into account, the situation is a bit more complicated because then there is an encoded nibble of a mixture of the S-box-output bits. In that case, an attacker can apply the attack several times for different choices of the linear mapping (to be more precise: it suffices the loop over different choices of a single column of this mapping).

As described above, an attacker may apply a differential attack if the attacker can isolate an intermediate value v, encoded by a fixed encoding, that has a smaller entropy as the part of the input (output) by which it is derived. The features of the embodiments described herein includes the following two aspects.

First, let w be a bitstring and denote by $h(w)$ the encoded version of w which is an intermediate result of the white-box implementation. Furthermore, let $w=u$; r (i.e., u concatenated with r, where u is as defined below and r a arbitrary bit-string of arbitrary length). The value u is fully determined by (1) a single first-round's S-box input and associated key-words or (2) a single last-round's S-box output and associated key-words. More precisely, $u=g(S(x_i \oplus k_i))$ in scenario (1) and $u=g(s^{-1}(y_i \oplus k_i^{10}) \oplus k_i^9)$ in scenario (2) (where $y_i$ is the output of the last round). Then the first aspect of the embodiment is the following: the bitlength of the encoded value $h(w)$ is at least the bitlength of S-box input in scenario (1) and at least the bitlength of the S-box output in scenario (2).

It is noted that the attack still works if the intermediate result u does not only depend on $x_i$ ($y_i$), but also on other parts of the input (output), if these contributions satisfy the following property: these parts of the input (output) are kept constant, then their contribution to u is given by a constant $\delta$ via $u=g(S(x_i \oplus k_i) \oplus \delta)$ ($u=g(s^{-1}(y_i \oplus k_i^{10}) \oplus k_i^9 \oplus \delta)$). Hence, in the above description of the first aspect of the invention, this possible additive dependency of the other S-box inputs (outputs) in u should be included.

The disadvantage of this approach is that the size of the white-box implementation increases considerably because S-box outputs are no longer split into nibbles. Therefore, the second aspect of the embodiment is the following. Wide encodings are only applied to the rounds where they are needed, i.e., the first and the last round. In the examples below a wide encoding is an encoding that encodes the complete output of a basic block, for example the 1 byte output of an S-box. In many white-box implementations of cryptographic functions, the implementation of the various basic blocks may be split into operations of nibbles (i.e., 4 bit operations) to allow for smaller tables. It is part of the embodiment that (for performance reasons), the property of the first aspects of the embodiment is not satisfied in the other rounds. It is noted that this embodiment is particularly relevant for AES, but may be implemented using other white-box implementations of cryptographic functions.

Below white-box embodiments are described using the AES (Advanced Encryption Standard) block cipher, because AES has become a widely used standard for block ciphers. AES is a block cipher with a block size of 128 bits or 16 bytes. The plaintext is divided in blocks of 16 bytes which form the initial state of the encryption algorithm, and the final state of the encryption algorithm is the cipher text. At any given point in the encryption algorithm these 16 bytes are the state of the encryption algorithm. To conceptually explain AES, the bytes of the state are organized as a matrix of 4×4 bytes. AES includes a number of rounds, which depend on the key size. Each round includes similar processing steps operating on bytes, rows, or columns of the state matrix, each round using a different round key in these processing steps. In the discussion using AES as an example, it is noted that AES defines a round in a specific manner. In the embodiments below, a round is any grouping of steps that includes at least one non-linear mapping function, such as an S-box in AES. Accordingly, a round as described below includes one non-linear mapping function and any combination of other steps of the cryptographic function. Further, the boundary of the round may start with the non-linear mapping function, for example an S-box, or any other operation that may be merged with the non-linear mapping function, for example a key addition.

FIG. 1 illustrates some main processing steps of a round of AES. The processing steps include:

AddRoundKey 110—each byte of the state is XORed with a byte of the round key;

SubBytes 120—a byte-to-byte permutation using a lookup table;

ShiftRows 140—each row of the state is rotated a fixed number of bytes; and

MixColumns 150—each column is processed using a modulo multiplication in $GF(2^8)$.

The steps SubBytes 120, ShiftRows 130, and MixColumns 150 are independent of the particular key used. The key is applied in the step AddRoundKey 110. Except for the step ShiftRows 140, the processing steps can be performed on each column of the 4×4 state matrix without knowledge of the other columns. Therefore, they can be regarded as 32-bit operations as each column consists of four 8-bit values. Dashed line 150 indicates that the process is repeated until the required number of rounds has been performed.

Each of these steps or a combination of steps may be represented by a lookup table or by a network of lookup tables. If the AddRoundKey 110 step is implemented by XORing with the round key, then the key is visible to the attacker in the white-box attack context. The AddRoundKey 110 step can also be embedded in lookup tables, which makes it less obvious to find out the key. In fact, it is possible to replace a full round of AES by a network of lookup tables. For example, the SubBytes 120, ShiftRows 130, and MixColumns 150 steps may be implemented using table lookups. Below a possible white-box implementation of AES in sufficient detail is discussed to describe the embodiments of the invention below, but further detailed descriptions of such an implementation are found in Chow 1. Also, other variations in the lookup table implementation may be used which are within the scope of the invention.

Figure 2:
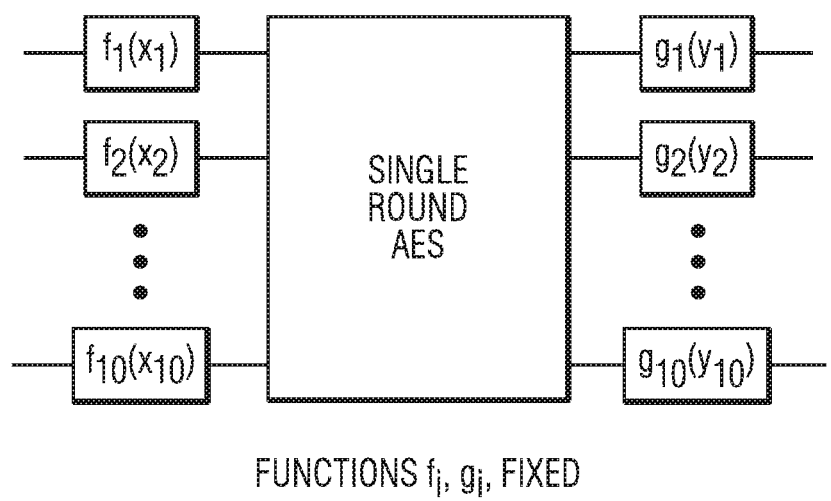
FIG. 2 illustrates a white-box AES implementation with fixed encodings on the input of the rounds.

Both the table-based white-box implementations and the finite state machine implementations have the property that all intermediate values in the implementation are encoded (as compared to a standard implementation). Examples of white-box implementations using finite state machines are disclosed in U.S. Patent Publication 2007/0014394 entitled "Data Processing Method" and a presentation at the Re-trust Sixth Quarterly Meeting entitled "Synchrosoft MCFACT™ Secure Data Processing Technology" by Wulf Harder and Atis Straujums dated Mar. 11, 2008, which each are hereby incorporated by reference for all purposes as if fully set forth herein. FIG. 2 illustrates a white-box AES implementation with fixed encodings on the input of the rounds, i.e., on the input of the S-boxes. As shown, each of the 16 input bytes are encoded by $f_i$ and each of the output bytes are encoded by g.

In order to describe embodiments of the invention, a basic description of a table-based white-box AES implementation will be described. For a more detailed description of a method for implementing a table-based white-box AES see Chow 1. Chow 1 illustrates a specific implementation that breaks up certain functions using tables of specified sizes. It is well understood that various other divisions of the tables may be made resulting in different functions for the look-up tables and different sizes. Further, while the embodiments of the invention described below use a table-based white-box implementation of AES, other ciphers and cryptographic functions may be implemented according to the embodiments described. Also, other types of white-box implementations may be used instead of the table-base implementation, for example, a finite-state implementation.

The description of the table-based white-box AES is split into two steps. In the first step, a round of AES is described as a network of lookup tables. In the second step, the tables are obfuscated by encoding their input and output.

Step 1: Implementing AES as a Network of Lookup Tables.

AES operates on data blocks of 16 bytes. These are typically described as a 4×4 byte matrix, called the state including bytes $x_{1,1}, x_{1,2}, x_{1,3}, \ldots x_{4,4}$. A round of AES as described above with respect to FIG. 1 include the following operations: AddRoundKey 110, SubBytes 120, ShiftRows 130, and MixColumns 140. The first two operations, AddRoundKey and SubBytes can be merged into a single T-box operation. That is, we can define a byte-to-byte function $T_{i,j}$ for input byte $x_{i,j}$ as $T_{i,j}(x_{i,j})=S(x_{i,j} \oplus k_{i,j})$ where $k_{i,j}$ is a single byte of a 16 byte round key based upon the AES key. Let $y_{i,j}$ be the output of $T_{i,j}$. The ShiftRows operations is just an index-renumbering of the output bytes $y_{i,j}$. For ease of presentation, this operation is omitted in this description, but may be incorporated into the look-up table implementing $T_{i,j}$ or implemented as a separate manipulation of the state matrix. In the MixColumns step, an output byte $z_{i,j}$ of the round is computed from the 4 output bytes $y_{1,j}, y_{2,j}, y_{3,j},$ and $y_{4,j}$ via the algebraic expression $z_{l,j}=MC_{l,1} \cdot y_{1,j} \oplus MC_{l,2} \cdot y_{2,j} \oplus MC_{l,3} \cdot y_{3,j} \oplus MC_{l,4} \cdot y_{4,j}$ in GF($2^8$) for some constants $MC_{l,r}$.

Now define a lookup table for each byte-to-byte function $Q_{i,j,l}(x_{i,j})=MC_{l,i} \cdot T_{i,j}(x_{i,j})$ with i, j, l=1, 2, . . . , 16. Then any output byte $z_{l,j}$ may be computed by XORing the results of these lookup tables, i.e., $z_{l,j}=Q_{1,j,l}(x_{1,j}) \oplus Q_{2,j,l}(x_{2,j}) \oplus Q_{3,j,l}(x_{3,j}) \oplus Q_{4,j,l}(x_{4,j})$. Note that the index i, j, l of Q-box can be interpreted as "the contribution of input byte i, j of a round to output byte l, j of the round".

The XOR may be alternatively implemented to operate on each of two nibbles (i.e., 4-bit values) as a lookup table to reduce the size of the XOR tables. Accordingly, the Q-box may be implemented to produce output nibbles so that the size of the tables is reduced. Therefore, the computation of each output byte $z_{l,j}$ of an AES-round has been described as a network of lookup tables. The network of lookup tables to compute a single output nibble of byte $z_{2,3}$ is shown in FIG. 3.

Figure 3:
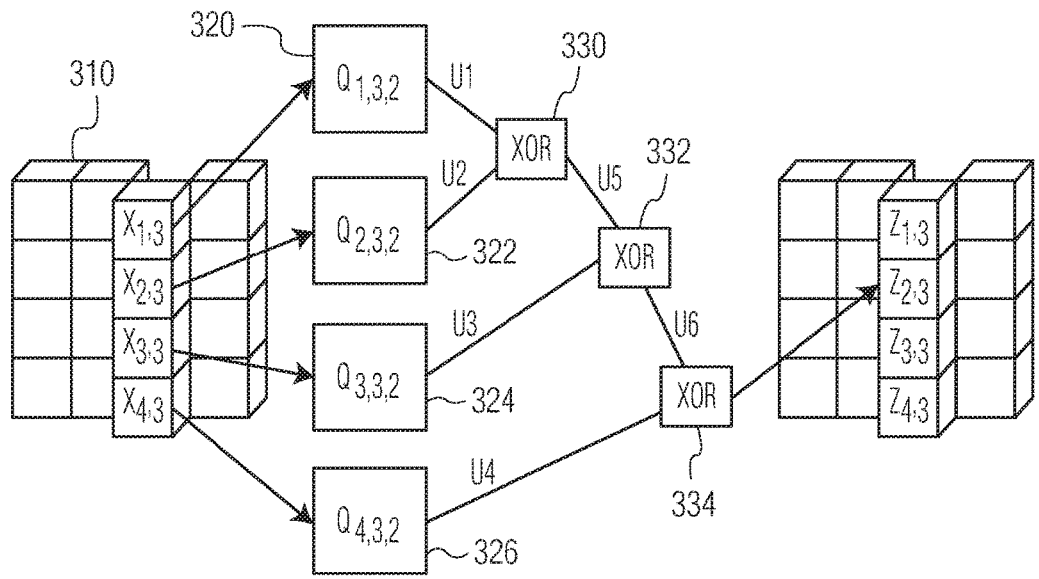
FIG. 3 illustrates the computation of one output nibble by means of a network of look-up tables.

FIG. 3 illustrates the computation of one output byte by means of a network of look-up tables. A set of input bytes $x_{1,3}, x_{2,3}, x_{3,3},$ and $x_{4,3}$ in the input state 310 are input into the Q-boxes 320, 322, 324, 326. The outputs $u_1, u_2$ of lookup tables 320 and 322 are fed into the XOR 330, and the outputs $u_3, u_5$ of lookup table 324 and XOR 330 are fed into the XOR 332. The outputs $u_4, u_6$ of table 326 and XOR 332 are fed into XOR 334. The output of XOR 334 is the first nibble of the output $z_{2,3}$ of output state 340. The Q-boxes may also be split into two Q-boxes that operate on two nibbles instead of the whole byte. This may be done by using additional Q-boxes along with a similar XOR network.

Further, additional sets of tables may be implemented to completely convert the input state 310 into the output state 340 by receiving a column of bytes from the input state and converting them into the output of the corresponding column of the output state.

Step 2: Obfuscating the Tables and the Intermediate Values

Figure 4:
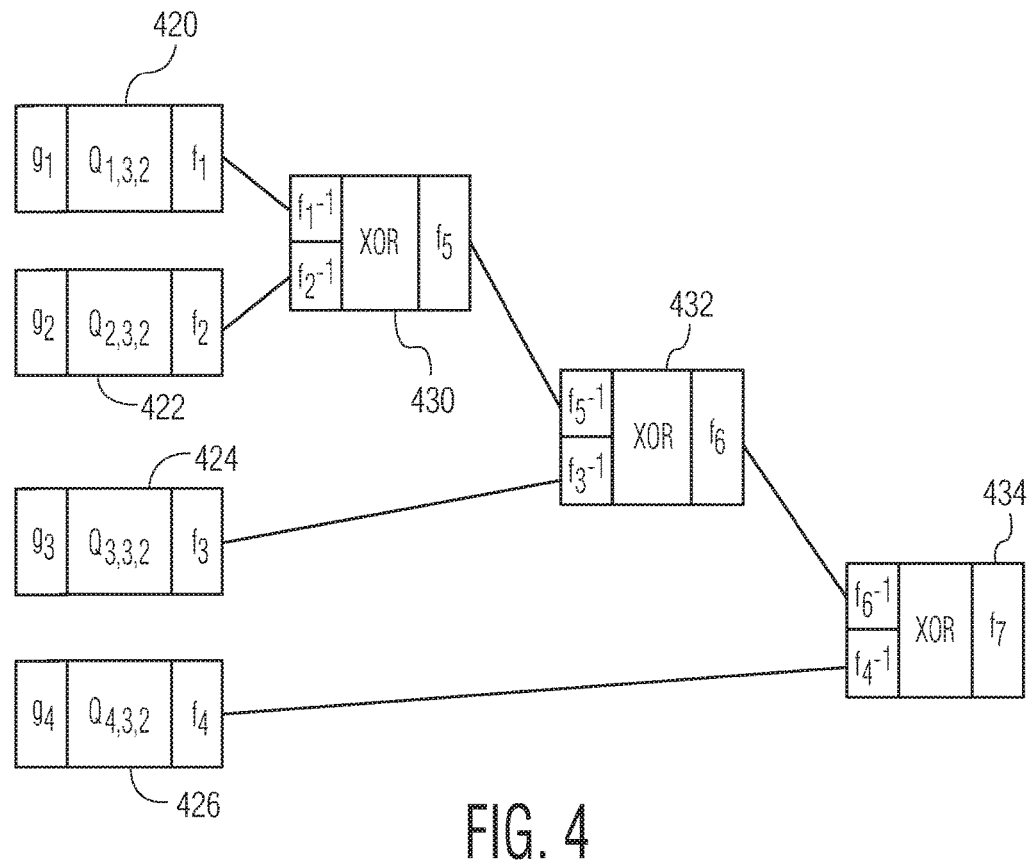
FIG. 4 illustrates a portion of the network table of FIG. 3 obfuscated by encoding the inputs and outputs.

In the implementation depicted in FIG. 3, the key may easily be extracted from the Q-boxes. Just applying the inverse MixColumns multiplication and the inverse S-box to the output reveals the plain AddRoundKey operation. To prevent this, the input and outputs of all lookup tables are encoded with arbitrary bijective functions. This is described in Chow 1. This means that a lookup table is merged with an encoding function that encodes the output and with a decoding function that decodes the input. The encodings are chosen such that the output encoding of one table matches the input encoding assumed in the next tables. A portion of the implementation of FIG. 3 is depicted in FIG. 4 for the first round. In this example, the input to the round is not encoded in order to be compliant with AES, but the output of the round is encoded. The output encoding is handled in the next round. That is, unlike the first round, the second round (and the later rounds) assumes that the input is encoded. Alternatively, the first round may receive an encoded input. This input encoding must then be applied elsewhere in the software program containing the white-box implementation. Similarly, the last round may or may not include an output encoding depending on whether the output is to be AES compliant. Note that in the white-box implementation obtained, both the lookup tables and the intermediate values are obfuscated.

FIG. 4 illustrates a portion of the network of tables of FIG. 3 obfuscated by encoding the inputs and outputs. The lookup tables 420, 422, 424, 426 correspond to lookup tables 320, 322, 324, 326 of FIG. 3. The inputs of lookup tables 420,

422, 424, 426 are encoded by functions $E_9$, $E_{10}$, $E_{11}$, $E_{12}$, respectively. The outputs of lookup tables 420, 422, 424, 426 are encoded by functions $f_1$, $f_2$, $f_3$, $f_4$ respectively. XOR 430 corresponds to XOR 330. The inputs of XOR 430 decode input using $f_1^{-1}$ and $f_2^{-1}$. The output of XOR 430 is then encoded by function $f_5$. In a similar manner XORs 432, 434 have input decodings and output encodings as illustrated. The output $z_{2,3}$ is encoded using $f_7$. This obfuscation may be applied in either the situation where bytes or nibbles are being used with the Q-boxes.

Figure 5:
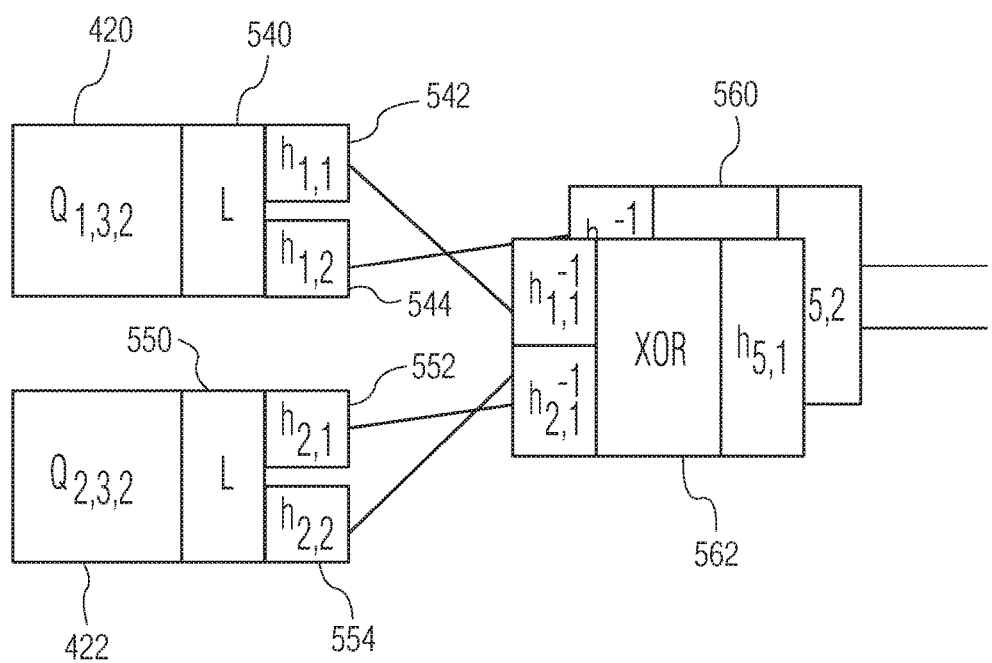
FIG. 5 illustrates the application of an 8-bit linear encoding followed by two 4-bit non-linear encodings of the output of the Q-boxes.

The problem with the presented white-box implementation is that the XOR-tables are pretty large: two 8-bit values are XORed to a 8 bit value. Therefore, Chow et al. propose to split the encodings into an 8-bit linear part and two 4-bit non-linear parts. As a result, the XOR may be implemented by 4-bit XORs. FIG. 5 illustrates the application of an 8-bit linear encoding followed by two 4-bit non-linear encodings of the output of the Q-boxes. For example, the Q-boxes 420 and 422 include an 8-bit linear encoding 540, 542 followed by 4-bit non-linear encodings 542, 544, 552, 554. The outputs of the Q-boxes 420 and 422 are then input to the XOR's 560, 562, which reverses the encodings.

The problem of this solution is, however, that it is vulnerable to the DCA attack. An embodiment is now described where the strategy of FIG. 5 is only applied where it is possible. This means that an 8-bit value u is encoded by an 8-bit non-linear encoding if $u=g(S(x_i \oplus k_i) \oplus \delta)$ for some function g and a value $\delta$ that is fixed if some other input bytes than $x_i$ is fixed. Otherwise, the encoding is split into a linear encoding followed by multiple smaller non-linear encodings. For the described white-box AES this means that in the first and last rounds are implemented as described by FIG. 4 (hence, all XOR-tables are 16-to-8-bit XOR tables) and the other rounds are implemented as described by FIG. 5 (hence, all XOR-tables are 8-to-4 bit XOR tables).

The various elements of FIGS. 4 and 5, e.g., Q-boxes and XORs are basic blocks that may be used to create the white-box implementation of the cryptographic operation. The Q-boxes and XORs may form a substitution layer that implements a substitution operation such as the AES S-box. It is noted that the embodiments described above are intended to protect against attacks between the first two substitution layers and the last two substitution layers of the cryptographic function.

A method according to the embodiments of the invention may be implemented on a computer as a computer implemented method. Executable code for a method according to the invention may be stored on a computer program medium. Examples of computer program media include memory devices, optical storage devices, integrated circuits, servers, online software, etc. Accordingly, a white-box system may include a computer implementing a white-box computer program. Such system, may also include other hardware elements including storage, network interface for transmission of data with external systems as well as among elements of the white-box system.

In an embodiment of the invention, the computer program may include computer program code adapted to perform all the steps of a method according to the invention when the computer program is run on a computer. Preferably, the computer program is embodied on a non-transitory computer readable medium.

Further, because white-box cryptography is often very complicated and/or obfuscated it is tedious for a human to write. It is therefore of advantage to have a method to create the cryptographic system according to the embodiments of the invention in an automated manner.

A method of creating the cryptographic system according to the invention may be implemented on a computer as a computer implemented method, or in dedicated hardware, or in a combination of both. Executable code for a method according to the invention may be stored on a computer program medium. In such a method, the computer program may include computer program code adapted to perform all the steps of the method when the computer program is run on a computer. The computer program is embodied on a non-transitory computer readable medium.

The cryptographic system described herein may be implemented on a user device such as a mobile phone, table, computer, set top box, smart TV, etc. A content provider, such as a television network, video stream service, financial institution, music streaming service, etc., may provide software to the user device for receiving encrypted content from the content provider. That software may have the encryption key embedded therein as described above, and may also include binding strings as described above. Then the content provider may send encrypted content to the user device, which may then decrypt using the supplied software and use the content.

Figure 6:
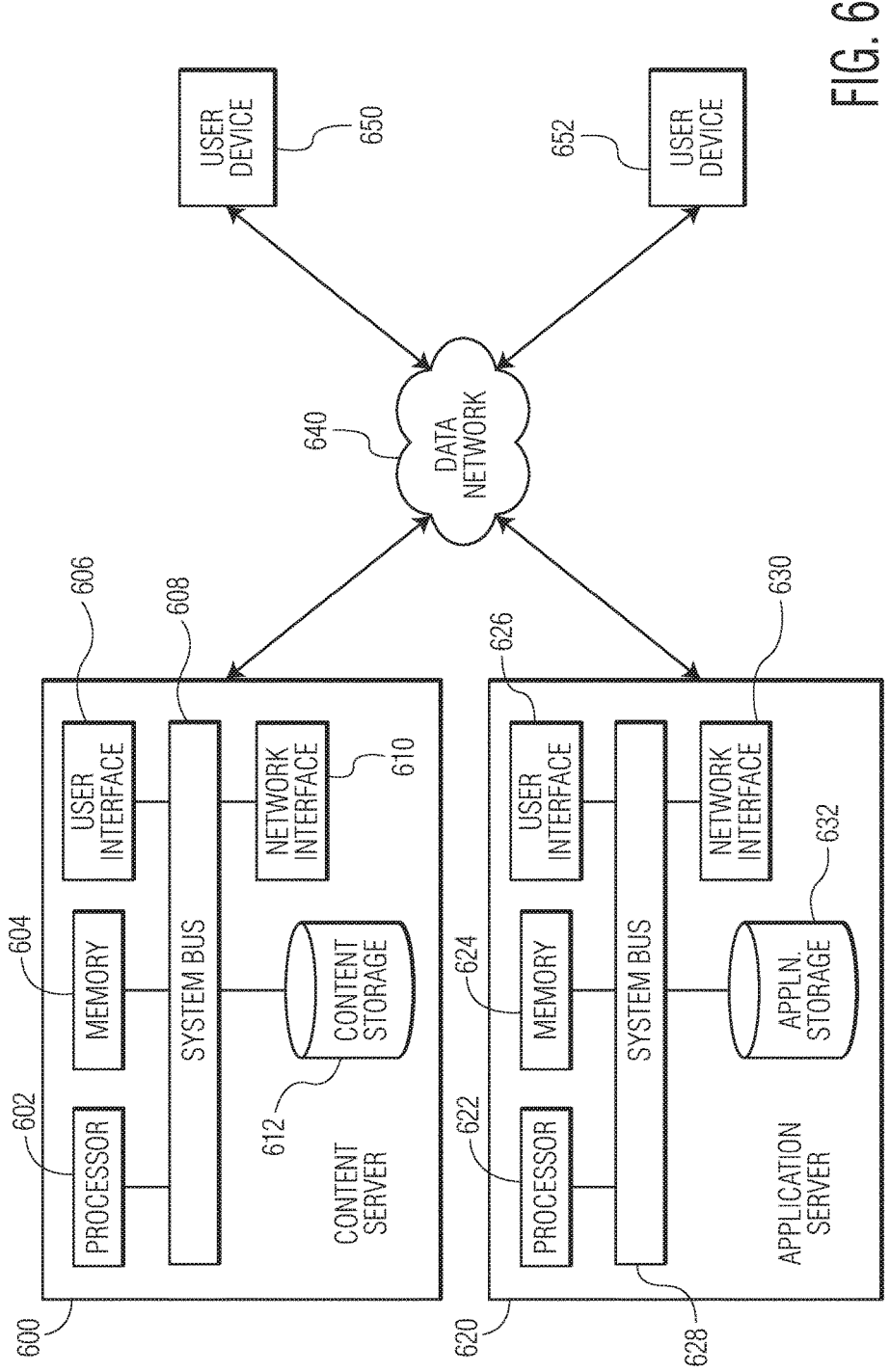
FIG. 6 illustrates a system for providing a user device secure content and a software application that processes the secure content.

FIG. 6 illustrates a system for providing a user device secure content and a software application that processes the secure content. The system includes a content server 600, application server 680, user devices 650, 652, and a data network 640. The user devices 650, 652 may request access to secure content provided by the content server 600 via data network 640. The data network can be any data network providing connectivity between the user devices 650, 652 and the content server 600 and application server 680. The user devices 650, 652 may be one of a plurality of devices, for example, set top boxes, media streamers, digital video recorders, tablets, mobile phones, laptop computers, portable media devices, smart watches, desktop computers, media servers, etc.

The user request for access may first require the downloading of a software application that may be used to process the secure content provided by the content server 600. The software application may be downloaded from the application server 680. The software application may be obscured using the techniques described above as well as operate as described above. Once the user devices 650, 652 install the software application, the user device may then download secure content from the content server 600 and access the secure content using the downloaded software application. For example, the downloaded software application may perform decryption of encrypted content received from the content server. In other embodiments, the software application may perform other secure operations, such as for example, encryption, digital signature generation and verification, etc.

The content server 600 may control the access to the secure content provided to the user devices 650, 652. As a result when the content server 600 receives a request for secure content, the content server 600 may transmit the secure content to the requesting user device. Likewise, the application server 620 may control access to the software application provided to the user devices 650, 652. As a result when the content server 620 receives a request for the software application, the application server 620 may transmit the software application to the requesting user device. A user device requesting the software application or secure content may also be authenticated by the respective servers, before providing the software application or secure content to the user device.

The content server 600 may include a processor 602, memory 604, user interface 606, network interface 610, and content storage 612 interconnected via one or more system buses 680. It will be understood that FIG. 6 constitutes, in some respects, an abstraction and that the actual organization of the components of the device 600 may be more complex than illustrated.

The processor 602 may be any hardware device capable of executing instructions stored in memory 604 or storage 612. As such, the processor may include a microprocessor, field programmable gate array (FPGA), application-specific integrated circuit (ASIC), or other similar devices.

The memory 604 may include various memories such as, for example L1, L2, or L3 cache or system memory. As such, the memory 602 may include static random access memory (SRAM), dynamic RAM (DRAM), flash memory, read only memory (ROM), or other similar memory devices.

The user interface 606 may include one or more devices for enabling communication with a user such as an administrator. For example, the user interface 606 may include a display, a mouse, and a keyboard for receiving user commands.

The network interface 610 may include one or more devices for enabling communication with other hardware devices. For example, the network interface 610 may include a network interface card (NIC) configured to communicate according to the Ethernet protocol. Additionally, the network interface 610 may implement a TCP/IP stack for communication according to the TCP/IP protocols. Various alternative or additional hardware or configurations for the network interface 610 will be apparent.

The content storage 612 may include one or more machine-readable content storage media such as read-only memory (ROM), random-access memory (RAM), magnetic disk storage media, optical storage media, flash-memory devices, or similar storage media. In various embodiments, the content storage 612 may store content to be provided to users.

The application server 620 includes elements like those in the content server 600 and the description of the like elements in the content server 600 apply to the application server 620. Also, the content storage 612 is replaced by application storage 632. Further, it is noted that the content server and applications server may be implemented on a single server. Also, such servers may be implemented on distributed computer systems as well as on cloud computer systems.

Any combination of specific software running on a processor to implement the embodiments of the invention, constitute a specific dedicated machine.

As used herein, the term "non-transitory machine-readable storage medium" will be understood to exclude a transitory propagation signal but to include all forms of volatile and non-volatile memory. Further, as used herein, the term "processor" will be understood to encompass a variety of devices such as microprocessors, field-programmable gate arrays (FPGAs), application-specific integrated circuits (ASICs), and other similar processing devices. When software is implemented on the processor, the combination becomes a single specific machine.

It should be appreciated by those skilled in the art that any block diagrams herein represent conceptual views of illustrative circuitry embodying the principles of the invention.

Although the various exemplary embodiments have been described in detail with particular reference to certain exemplary aspects thereof, it should be understood that the invention is capable of other embodiments and its details are capable of modifications in various obvious respects. As is readily apparent to those skilled in the art, variations and modifications can be effected while remaining within the spirit and scope of the invention. Accordingly, the foregoing disclosure, description, and figures are for illustrative purposes only and do not in any way limit the invention, which is defined only by the claims.

What is claimed is:

1. A method for mapping an input message to an output message by a keyed cryptographic operation in a white-box cryptographic system to resist differential attacks, the keyed cryptographic operation including a plurality of substitution layers and state data, comprising:
    mapping the input message to first state data in a first substitution layer of the keyed cryptographic operation including a substitution box (S-box), wherein the first substitution layer includes N basic blocks that implement the first substitution layer and wherein a non-linear encoding having a first size is placed on inputs and outputs of the N basic blocks of the first substitution layer, where N is an integer;
    mapping the first state data to second state data in a plurality of intermediate substitution layers of the keyed cryptographic operation each intermediate layer including an S-box, wherein the intermediate substitution layers include M blocks that implement the intermediate substitution layers and wherein a plurality of non-linear encodings having a second size are placed on the inputs and outputs of the M basic blocks of the intermediate substitution layers, where M is an integer; and
    mapping the second state data to the output message in a final substitution layer of the keyed cryptographic operation including an S-box, wherein the final substitution layer includes K basic blocks that implement the final substitution layer and wherein a non-linear encoding having a third size is placed on the inputs and outputs of the K basic blocks of the final substitution layer, where K is an integer,
    wherein the first size and the third size are greater than the second size,
    wherein N<M,
    wherein K<M.

2. The method of claim 1, wherein the first size and the third size are greater than or equal to twice the second size.

3. The method of claim 1, wherein the cryptographic operation is the Advanced Encryption Standard (AES).

4. The method of claim 1, wherein the cryptographic operation is the Data Encryption Standard (DES).

5. The method of claim 1, wherein the first size is 8-bits, the second size is 4-bits, and the third size is 8-bits.

6. The method of claim 5, wherein:
    basic blocks implementing an XOR function in the intermediated substitution layers operate on 4-bit inputs to produce 4-bit outputs, and
    basic blocks implementing an XOR function in the first and last substitution layers operate on 8-bit inputs to produce 8-bit outputs.

7. The method of claim 1, wherein:
    basic blocks implementing an XOR function in the intermediated substitution layers operate on inputs having the second size to produce outputs having the second size;
    basic blocks implementing an XOR function in the first substitution layer operate on inputs having the first size to produce outputs having the first size; and basic blocks implementing an XOR function in the last substitution layer operate on inputs having the third size to produce outputs having the third size.

8. The method of claim 1, wherein a linear encoding is also placed on the inputs and outputs of the M basic blocks in the intermediate substitution layers.

9. A non-transitory machine-readable storage medium encoded with instructions for implementing mapping an input message to an output message by a keyed cryptographic operation in a white-box cryptographic system to resist differential attacks, the keyed cryptographic operation including a plurality of substitution layers and state data, comprising:

instructions for mapping the input message to first state data in a first substitution layer of the keyed cryptographic operation including a substitution box (S-box), wherein the first substitution layer includes N basic blocks that implement the first substitution layer and wherein a non-linear encoding having a first size is placed on inputs and outputs of the N basic blocks of the first substitution layer, where N is an integer;

instructions for mapping the first state data to second state data in a plurality of intermediate substitution layers of the keyed cryptographic operation each intermediate layer including an S-box, wherein the intermediate substitution layers include M blocks that implement the intermediate substitution layers and wherein a plurality of non-linear encodings having a second size are placed on the inputs and outputs of the M basic blocks of the intermediate substitution layers, where M is an integer; and instructions for mapping the second state data to the output message in a final substitution layer of the keyed cryptographic operation including an S-box, wherein the final substitution layer includes K basic blocks that implement the final substitution layer and wherein a non-linear encoding having a third size is placed on the inputs and outputs of the K basic blocks of the final substitution layer, where K is an integer, wherein the size and the third size are greater than the second size, wherein N<M, wherein K<M.

10. The non-transitory machine-readable storage medium of claim 9, wherein the first size and the third size are greater than or equal to twice the second size.

11. The non-transitory machine-readable storage medium of claim 9, wherein the cryptographic operation is the Advanced Encryption Standard (AES).

12. The non-transitory machine-readable storage medium of claim 9, wherein the cryptographic operation is the Data Encryption Standard (DES).

13. The non-transitory machine-readable storage medium of claim 9, wherein the first size is 8-bits, the second size is 4-bits, and the third size is 8-bits.

14. The non-transitory machine-readable storage medium of claim 13, wherein:

basic blocks implementing an XOR function in the intermediated substitution layers operate on 4-bit inputs to produce 4-bit outputs, and basic blocks implementing an XOR function in the first and last substitution layers operate on 8-bit inputs to produce 8-bit outputs.

15. The non-transitory machine-readable storage medium of claim 9, wherein:

basic blocks implementing an XOR function in the intermediated substitution layers operate on inputs having the second size to produce outputs having the second size;

basic blocks implementing an XOR function in the first substitution layer operate on inputs having the first size to produce outputs having the first size; and basic blocks implementing an XOR function in the last substitution layer operate on inputs having the third size to produce outputs having the third size.

16. The non-transitory machine-readable storage medium of claim 9, wherein a linear encoding is also placed on the inputs and outputs of the M basic blocks in the intermediate substitution layers.

* * * * *